United States Patent [19]

McDougal

[11] 4,194,745

[45] Mar. 25, 1980

[54] CONTROLLED CLEARANCE SEAL

[76] Inventor: Thomas L. McDougal, Rte. 4 (U.S. Rte. 250 S), Grafton, W. Va. 26354

[21] Appl. No.: 35,305

[22] Filed: May 2, 1979

[51] Int. Cl.$^2$ .................... F16J 15/34; F16J 15/40
[52] U.S. Cl. .................................... 277/27; 277/83; 277/134; 277/173; 277/236
[58] Field of Search .................... 277/27, 38, 39, 81 R, 277/13, 14 R, 14, 25, 83, 93 R, 134, 135, 173, 236 DIG. 5

[56] References Cited

U.S. PATENT DOCUMENTS

| | | | |
|---|---|---|---|
| 2,879,085 | 3/1959 | Andersen | 277/173 X |
| 3,001,806 | 9/1961 | Macks | 277/27 X |
| 3,093,382 | 6/1963 | Macks | 277/27 |
| 3,367,682 | 2/1968 | Meriano | 277/236 X |
| 3,438,638 | 4/1969 | Newcomb et al. | 277/27 |
| 4,161,317 | 7/1979 | Sakamaki | 277/25 |

FOREIGN PATENT DOCUMENTS 1446328  6/1966  France .................................. 277/25

*Primary Examiner*—Jr. Ward
*Attorney, Agent, or Firm*—Mason, Fenwick & Lawrence

[57] ABSTRACT

A controlled clearance seal is disclosed for use on a shaft rotatably supported in a housing to seal high pressure hydraulic fluid in a housing having a sealing face adjacent the shaft which is symmetrical with respect to the center line of the shaft. The seal includes a generally annular body formed of a material having a coefficient of expansion slightly greater than the coefficient of expansion of the shaft. The entire body surface is impregnated with Teflon compounds providing permanent lubricity and high hardness. The body has a sealing face engageable with the sealing face on the housing and has a flange portion projecting axially away from the sealing face on the body. The flange portion has an inner circumferential surface engageable with the shaft and the inner surface has an inside diameter slightly larger than the diameter of the shaft thereby permitting the seal body to rotate with the shaft until high pressure hydraulic fluid presses the sealing face on the body against the sealing face on the housing to frictionally retain the sealing body in a fixed position relative to the housing and causes the flange to be compressed radially against the shaft. This momentary rubbing creates friction and heat which expands the body relieving the friction and increasing the clearance. A balance is instantly established between constricting pressure, friction, heat and expansion resulting in a nearly constant clearance with almost no leakage.

6 Claims, 9 Drawing Figures

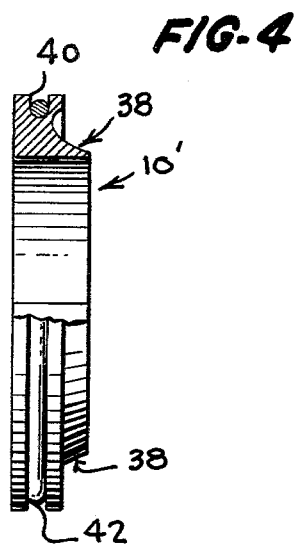
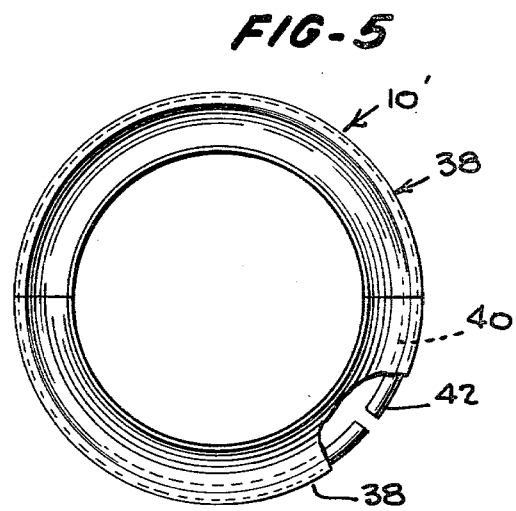
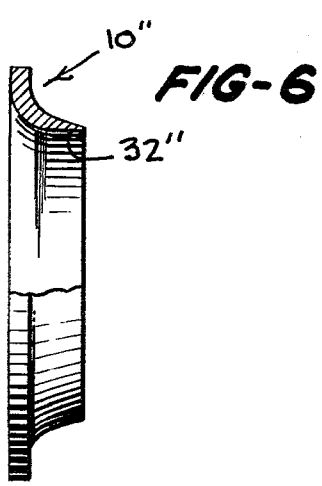
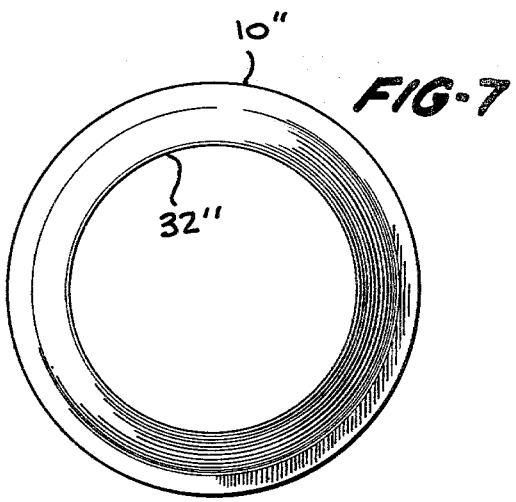
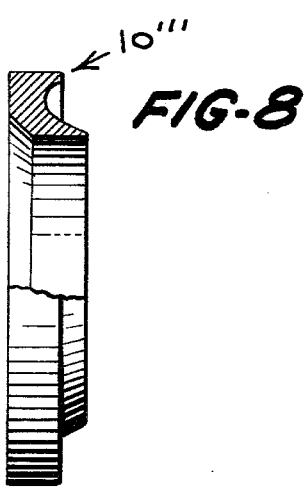
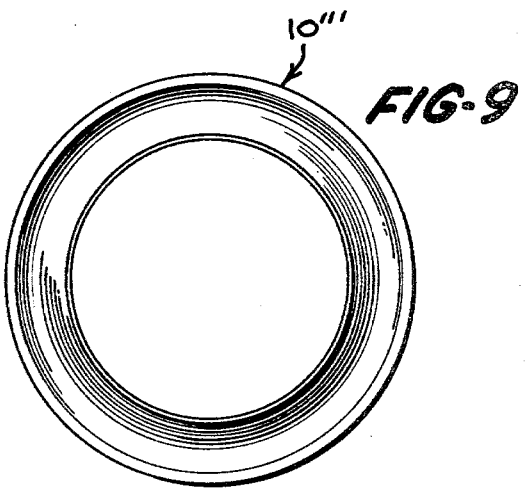

CONTROLLED CLEARANCE SEAL

This invention relates to hydraulic seals for rotating shafts and more particularly to a controlled clearance seal which is self-aligning and results in extremely low leakage and little or no shaft wear in high pressure hydraulic equipment.

The prior art comprises numerous seals for sealing between housings and shafts exposed to high pressure hydraulic fluids such as occurs in hydraulic pumps and motors and similar applications. These seals have generally been of the type formed of a composite of synthetic rubber and metal rings such as "O" rings with back-up rings. These previously known seals have generally had a high failure rate above 2500 p.s.i. and have caused damage to the rotating shafts upon which they are mounted due to rubbing contact. Previously known metal ring seals having one radial crack or groove for expansion have caused unnecessary shaft and seal wear due to the constant rubbing contact with the shaft. Additionally, in this second type of seal, the expansion crack is never completely closed during operation and in fact increases in area as the temperature increases thereby causing excessively large leakage to occur. Still other seals have been formed of plastic or plastic metal composites. Such seals have a 100% failure rate at very high pressure due to inadequate structural integrity and poor heat dissipation.

Accordingly, it is the primary object of the present invention to provide a novel controlled clearance seal.

An additional object of the present invention is to provide a controlled clearance seal having no elastomeric material which may blowout at high pressures.

A further object of the present invention is to provide a one piece controlled clearance seal having no radial crack or grooves to leak.

A still further object of the present invention is to provide a novel seal which does not mar or damage the shaft causing seal wear and excessive leakage.

Another object of the present invention is to provide a seal having an impregnated surface which contacts the shaft to further reduce wear, increase lubricity and act as a heat sink for the heat generated between the rotating shaft and the seal.

A further object of the present invention is to provide a controlled clearance seal which is less costly to manufacture and which may be easily die cast, coined, turned, or stamped from sheet stock.

A still further object of the present invention is to provide a controlled clearance seal having a split to permit installation on flanged shafts and in other applications where it is impossible to use single piece seals, and where said split remains closed and liquid tight during operation.

An additional object of the present invention is to provide a controlled clearance shaft seal which is capable of sealing hydraulic fluid under pressures exceeding 3000 p.s.i.

An additional object of the present invention is to provide a controlled clearance seal having a structural shape and material that is heat and pressure sensitive.

Other objects and advantages of the invention will become more apparent to those persons having ordinary skill in the art to which the invention pertains taking the following descriptions in conjunction with the accompanying drawings wherein:

FIG. 4 is an alternative embodiment of the seal shown in FIG. 1 and is a split version;

FIG. 5 is a fragmentary front elevational view of the seal shown in FIG 4;

FIG. 6 is a second alternative embodiment of the seal shown in FIG. 1 suitable for stamping from sheet stock.

FIG. 7 is a front elevational view of the alternative embodiment shown in FIG. 6;

FIG. 8 is a third alternative embodiment of the seal shown in FIG. 1; and

FIG. 9 is a front elevational view of the alternative embodiment shown in FIG. 8.

Figure 1:
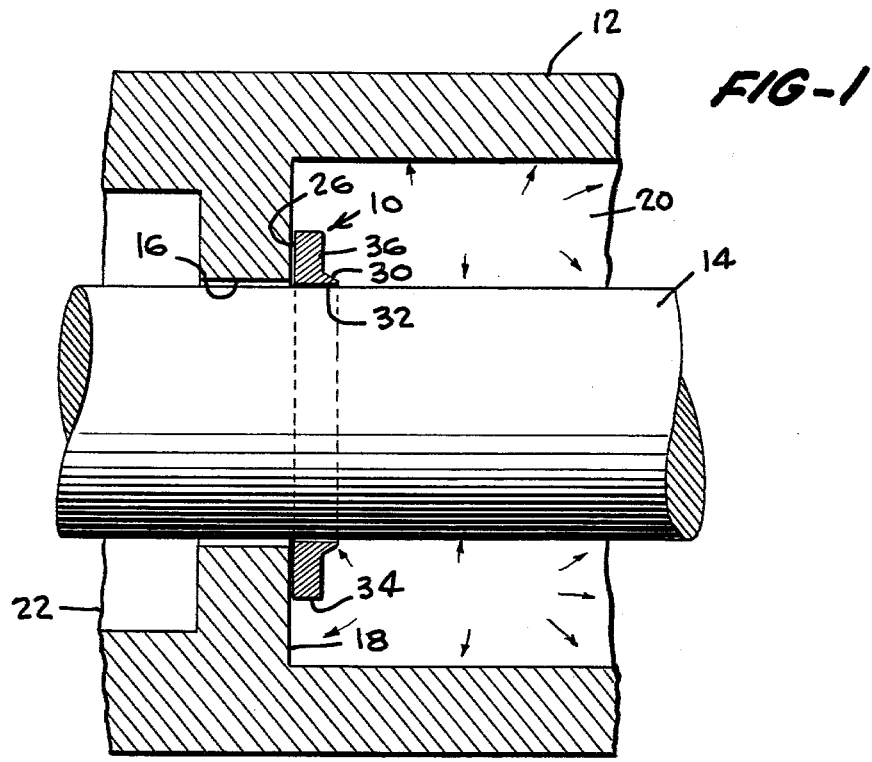
FIG. 1 is a fragmentary side elevational view of a seal according to the present invention mounted on a shaft in a housing.
Figure 2:
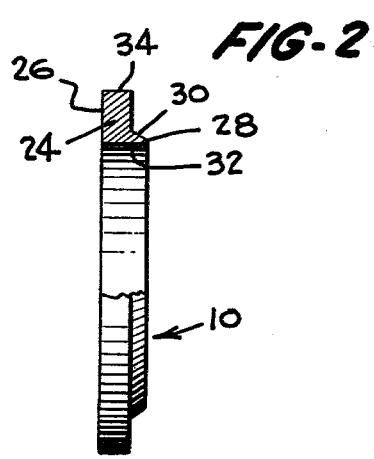
FIG. 2 is a fragmentary cross-sectional view of the seal shown in FIG. 1.
Figure 3:
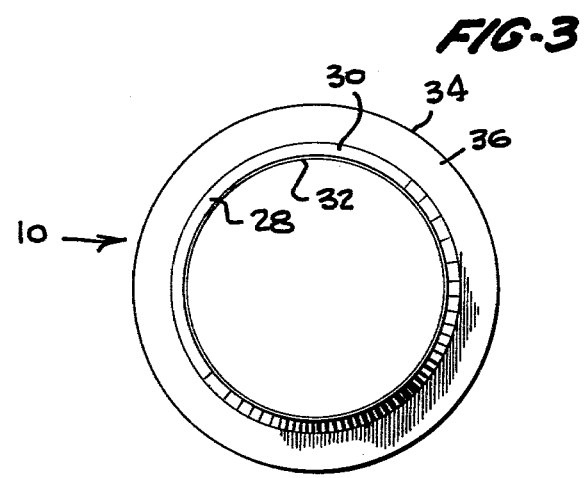
FIG. 3 is a front elevational view of the seal shown in FIG. 1.

Referring to the drawings, there is illustrated in FIGS. 1, 2 and 3 a controlled clearance seal 10 mounted in a housing 12 to prevent leakage along a rotatable shaft 14.

The housing 12 is typical of those found in hydraulic pumps and motors and similar applications. A clearance bore 16 extends through the housing with the rotatable shaft 14 passing therethrough and being supported on conventional bearings or the like to permit rotation of the shaft 14 within the bore 16 without contacting the housing 12. A sealing face 18 is provided adjacent the bore 16 and is symmetrical with respect to the axis of the shaft 14. The sealing face 18 is machined to the desired finish to achieve the desired leakage rate past the seal 10. High pressure hydraulic fluid to pressures exceeding 3000 p.s.i. are supplied in compartment 20 as indicated by the small arrows in FIG. 1. A vented chamber 22 on the left-hand side of the bore 16 permits the hydraulic fluid which leaks past seal 10 to be returned to the sump through flow passageways which are not disclosed.

The seal 10, as disclosed in FIGS. 1, 2 and 3, include a generally annular body 24 which is formed of a material having a coefficient of expansion slightly greater than the coefficient of expansion of the shaft 14. The shaft 14 is generally constructed of steel whereas the seal body 24 is constructed of aluminum, bronze or any other suitable material having the desired characteristics. The body 24 has a radially extending sealing face 26 which contacts the sealing face 18 on the housing 12 when the seal 10 is located in the desired position as indicated in FIG. 1.

Extending away from the sealing face 26 on the body 24 is an axially projecting flange portion 28 integrally formed therewith to provide an outer surface 30 against which the hydraulic fluid in chamber 20 acts to cause compression of the seal and reduce the clearance between the shaft and the seal. An inner circumferential surface 32 of the flange portion 28 has an inside diameter slightly larger than the diameter of the shaft to slidingly engage the shaft.

An outer circumferential surface 34 provides additional surface against which the high pressure hydraulic fluid can act upon the body to cause compression of the body and reduce the diameter of the inner circumferential surface 32. A radially extending piston surface 36 is provided on the side of the seal opposite the sealing face 26 to permit the hydraulic fluid to force the seal against the sealing face 18 on the housing 12 as suggested in FIG. 1.

When the body 24 is formed of aluminum, bronze, or other metal, all or part of the surfaces may be impregnated with Teflon using the Tufram or Nedox process available from General Magnaplate of Linden, New Jersey. Such a process forms a corrosion resistant, low friction, wear resistant surface having a has of 50 to 60 Rockwell "C".

Referring now to the alternative embodiment shown in FIG. 4, the seal 10' is generally similar in configuration to the seal 10 shown in FIGS. 1, 2 and 3. However, it is formed by two identical portions 38 having a circumferential groove 40 extending therearound to receive a split circular spring ring 42 to retain the split portions 38 on a shaft in a manner similar to that shown in FIG. 1 while permitting the seal to be assembled on shafts having flanges, shoulders and the like.

Referring now to the second alternative embodiment shown in FIGS. 6 and 7, this configuration utilizes a stamped sheet material cross section. The circumferential inner surface 32" is somewhat smaller in area than the circumferential innser surface 32 in the preferred embodiment shown in FIGS. 1, 2 and 3. However, operation remains unchanged.

Referring now to the embodiment shown in FIG. 8, there is disclosed a configuration similar to the preferred embodiment but with a reduced cross-section for operation at low pressures.

The principles of operation of the present invention are as follows. The housing 12 is stationary while the shaft 14 rotates in either direction while pivotally supported therein. Without having hydraulic pressure supplied to chamber 20, the seal 10 rotates on and with the shaft 14. As the chamber 20 is supplied with high pressure hydraulic fluid, some fluid leaks past the seal 10 through the bore 16 and is returned to the sump from the vent chamber 22. As the pressure is increased in chamber 20, the seal 10 is forced along the shaft toward the left until the sealing face 26 on the seal 10 contacts the sealing face 18 on the housing 12 to stop leakage past this major seal area. Rotation of the seal ceases due to the friction created between the seal and the housing caused by hydraulic pressure being exerted against the piston area 36.

The seal is aligned by the shaft itself thereby avoiding any machine tolerances which could cause eccentricity between the shaft and a circumferential inner surface 32. As the shaft 14 rotates within the seal 10, friction causes the seal to heat thereby expanding since it is formed of a material having a higher coefficient of friction than the shaft. This relative expansion increases the clearance between the seal and the shaft to avoid rubbing contact and resultant wear on the shaft and/or seal. Due to the rapid heat sink properties of the seal, expansion stops almost exactly at the samt instant the rubbing stops and seal contraction begins. What then actually happens is a dynamic balance is instantly established between friction, heat, expansion, contraction, and pressure causing an almost ideal constant clearance to exist between shaft 14 and seal 10 resulting in extremely low leakage. Tests to date indicate zero leakage.

As pressure in chamber 20 is increased or decreased, the ideal balance is instantly reestablished providing a controlled clearance between shaft 14 and seal 10 that remains nearly constant over a wide range of temperatures and pressures.

Therefore, by fabricating a seal using a high strength, high heat conductivity material having an expansion rate slightly greater than the shaft material to eliminate the need for radial expansion cranks coupled with a cross-section sensitive constrictively to pressure during operation, the present invention provides a seal which automatically and simultaneously expands and contracts with temperature and pressure to provide almost 100% sealing efficiency with pressures of 5000 p.s.i. and beyond and temperatures at 350° F. Actual cross-section design may vary for special applications to achieve optimum results.

In the foregoing detailed description, it will be evident that there are a number of changes, adaptations and modifications of the present invention which come within the province of those skilled in the art. However, it is intended that all such variations not departing from the spirit of the invention be considered within the scope thereof and as limited solely by the appended claims.

I claim:

1. A controlled clearance seal for use on a shaft rotatably supported in a housing to seal high pressure hydraulic fluid in a housing having a sealing face adjacent the shaft and symmetrical with respect to the center line of the shaft, said seal comprising a generally annular body formed of a high strength material having a coefficient of expansion slightly greater than the coefficient of expansion of said shaft, said body having a sealing face engageable with said sealing face on said housing, said body having a flange portion projecting axially away from said sealing face on said body with said flange portion having an inner circumferential surface engageable with said shaft with said inner surface having an inside diameter slightly larger than the diameter of said shaft thereby permitting said body to rotate with said shaft until high pressure hydraulic fluid presses said sealing face on said body against said sealing face on the housing to frictionally retain the seal body in a fixed position relative to said housing and causing said flange to be compressed radially to decrease clearance between said body and said shaft causing said body to rub said shaft with resulting friction generating heat which causes expansion of said body and said shaft, whereupon said body expands at a greater rate than said shaft permitting the clearance between said body and said shaft to increase until rubbing of said shaft by said body ceases, thus stopping the heat generation whereupon said body instantly contracts due to cooling and pressure, until said body and said shaft again come into rubbing contact, with such cycle as just described involving rubbing, heating, expansion, cooling, contraction, and rubbing, being repeated several times per second resulting in a dynamic balance of said forces thereby establishing a virtually constant controlled clearance between said body and said shaft resulting in an extremely low leakage rate over a wide range of temperatures and pressures with such operational efficiency of said seal being a direct result of the combination of cross-section design and high strength material selection.

2. The controlled clearance seal of claim 1 wherein said seal cross-section design in combination with high strength material permits wobble free operation of said seal without the need for pinning against rotation.

3. The controlled clearance seal of claim 1 wherein said seal is formed from metal and part or all of its surface is impregnated with Teflon to reduce wear.

4. The controlled clearance seal of claim 1 wherein said body has a circumferential groove extending around an outer surface thereof, wherein said body is formed of two identical portions and additionally including a spring ring insertable in said groove to retain said portions in position on said shaft thereby providing a split seal which is readily assembled on a shaft having shoulders.

5. The controlled clearance seal of claim 1 wherein said seal is formed entirely of high strength metal alloys for use in ultra high pressure applications.

6. The controlled clearance seal of claim 1 wherein said seal is formed by coining so as to reduce manufacturing costs.

* * * * *